US012587548B2

(12) United States Patent
Verma

(10) Patent No.: US 12,587,548 B2
(45) Date of Patent: Mar. 24, 2026

(54) ARTIFICIAL INTELLIGENCE-BASED AUTOMATED EVENT LOG MAPPING

(71) Applicant: Google LLC, Mountain View, CA (US)

(72) Inventor: Rishi Verma, Bangalore (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/425,095

(22) Filed: Jan. 29, 2024

(65) Prior Publication Data

US 2025/0247400 A1     Jul. 31, 2025

(51) Int. Cl.
*H04L 9/40* (2022.01)

(52) U.S. Cl.
CPC ................................. *H04L 63/1416* (2013.01)

(58) Field of Classification Search
CPC .................................................... H04L 63/1416
See application file for complete search history.

(56) References Cited

U.S. PATENT DOCUMENTS

| | | | |
|---|---|---|---|
| 11,366,734 B2 | 6/2022 | Xia | |
| 11,475,353 B2 | 10/2022 | Rangasamy | |
| 11,537,498 B2 | 12/2022 | Ibrahim et al. | |
| 11,625,366 B1 | 4/2023 | Steiman et al. | |
| 11,755,588 B2 | 9/2023 | Seshadri et al. | |
| 12,008,004 B1 | 6/2024 | Fournier et al. | |
| 12,107,874 B2 | 10/2024 | Malhotra | |

| | | | | |
|---|---|---|---|---|
| 2020/0019484 A1 | 1/2020 | Kolesnik et al. | | |
| 2020/0112590 A1 | 4/2020 | Bhatia et al. | | |
| 2022/0391443 A1* | 12/2022 | Avnor | .................... | H04N 21/84 |
| 2023/0222358 A1 | 7/2023 | Wu et al. | | |
| 2023/0409568 A1* | 12/2023 | Zhang | .................... | G06F 16/244 |
| 2024/0161648 A1 | 5/2024 | Davies et al. | | |

OTHER PUBLICATIONS

International Search Report and Written Opinion for International Application No. PCT/US2025/010113, mailed Mar. 25, 2025, 14 Pages.
Nam S., et al., "Log Analysis and Prediction for Anomaly Detection in Network Switches", The International Conference on Network and Service Management (CNSM), IEEE, Oct. 2023, 7 Pages.

* cited by examiner

*Primary Examiner* — Brian Whipple
(74) *Attorney, Agent, or Firm* — Lowenstein Sandler LLP

(57) ABSTRACT

A method may include obtaining an event log of one or more event logs of telemetry data. The event log may include one or more event log key-value pairs. The method may include identifying, from among one or more predefined fields and by using an artificial intelligence (AI) model, a predefined field for an event log key of an event log key-value pair of the one or more event log key-value pairs. The method may include generating, using the AI model, a confidence score associated with the predefined field. The method may include, responsive to the confidence score satisfying a threshold confidence score criterion, mapping a value of the event log key-value pair to the predefined field.

20 Claims, 11 Drawing Sheets

100

100

200

Figure 2B:
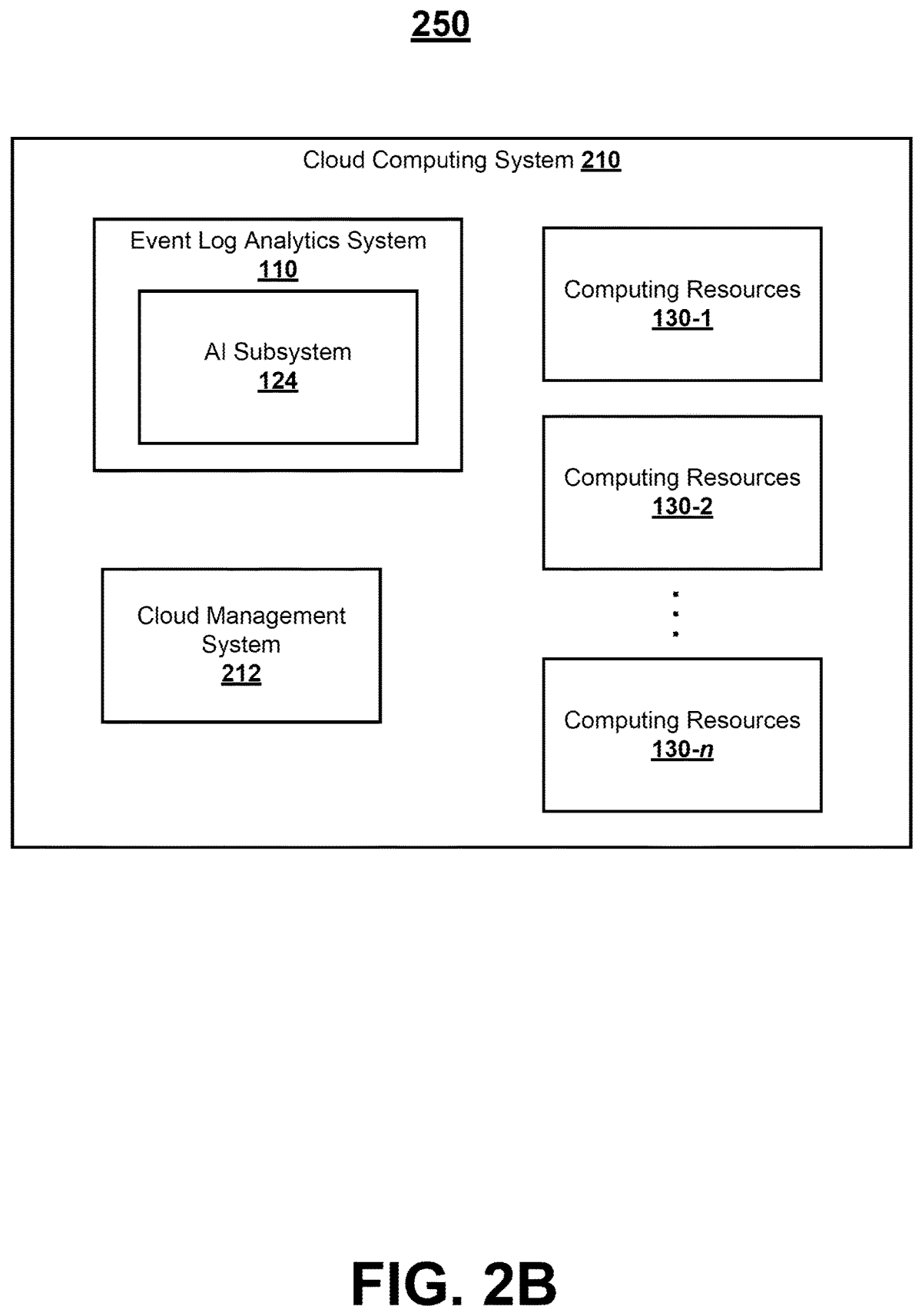

250

Cloud Computing System 210

Event Log Analytics System
110

AI Subsystem
124

Cloud Management
System
212

Computing Resources
130-1

Computing Resources
130-2

Computing Resources
**130-*n***

```
{
  402-1 ➤ "timestamp": 1588059648.129,        404-1        406-1
  402-2 ➤ "duration": 23,  406-2
         "ip": {  404-2   404-3        406-3
  402-3 ➤ "client_address": "192.168.23.4",
  402-4 ➤ "target_address": "203.0.113.52"
         },       404-4      404-6       406-4
         "http":{        404-5      406-5
  402-5 ➤ "result_code": "TCP_HIT/200",
  402-6 ➤ "response_length": 904,  406-6
  402-7 ➤ "request_method": "GET"
         },  404-8      404-7         406-7        406-8
  402-8 ➤ "url": "www.sample.com/images/logo.png",
  402-9 ➤ "content_type": "image/JPEG"
}           404-9              406-9
```

| Event Log Field | Predefined Field |
|---|---|
| timestamp | metadata.event_timestamp |
| duration | |
| ip.client_address | principal.ip |
| ip.target_address | target.ip |
| http.result_code | network.http.response_code |
| http.response_length | network.http.received_bytes |
| http.request_method | network.http.method |
| url | target.url |
| content_type | |

```
{
        "metadata": {                                                     604-1
602-1 ──►    "event_timestamp": "2020-04-28T07:40:48.129Z",
602-8 ──►    "event_type": "NETWORK_HTTP",      604-8
602-9 ──►    "product_name": "Acme Web Proxy",
602-10 ──►   "vendor_name": "Acme"                  604-9
        },                                  604-10
        "principal": {
602-2 ──►    "ip": "192.168.23.4"      604-2
        },
        "target": {                          604-7
602-7 ──►    "url": "www.sample.com/images/logo.png",
602-3 ──►    "ip": "203.0.113.52"      604-3
        },
        "network": {
            "http": {
602-6 ──►        "method": "GET",      604-6
602-4 ──►        "response_code": 200,      604-4
602-5 ──►        "received_bytes": 904      604-5
            }
        },
}
```

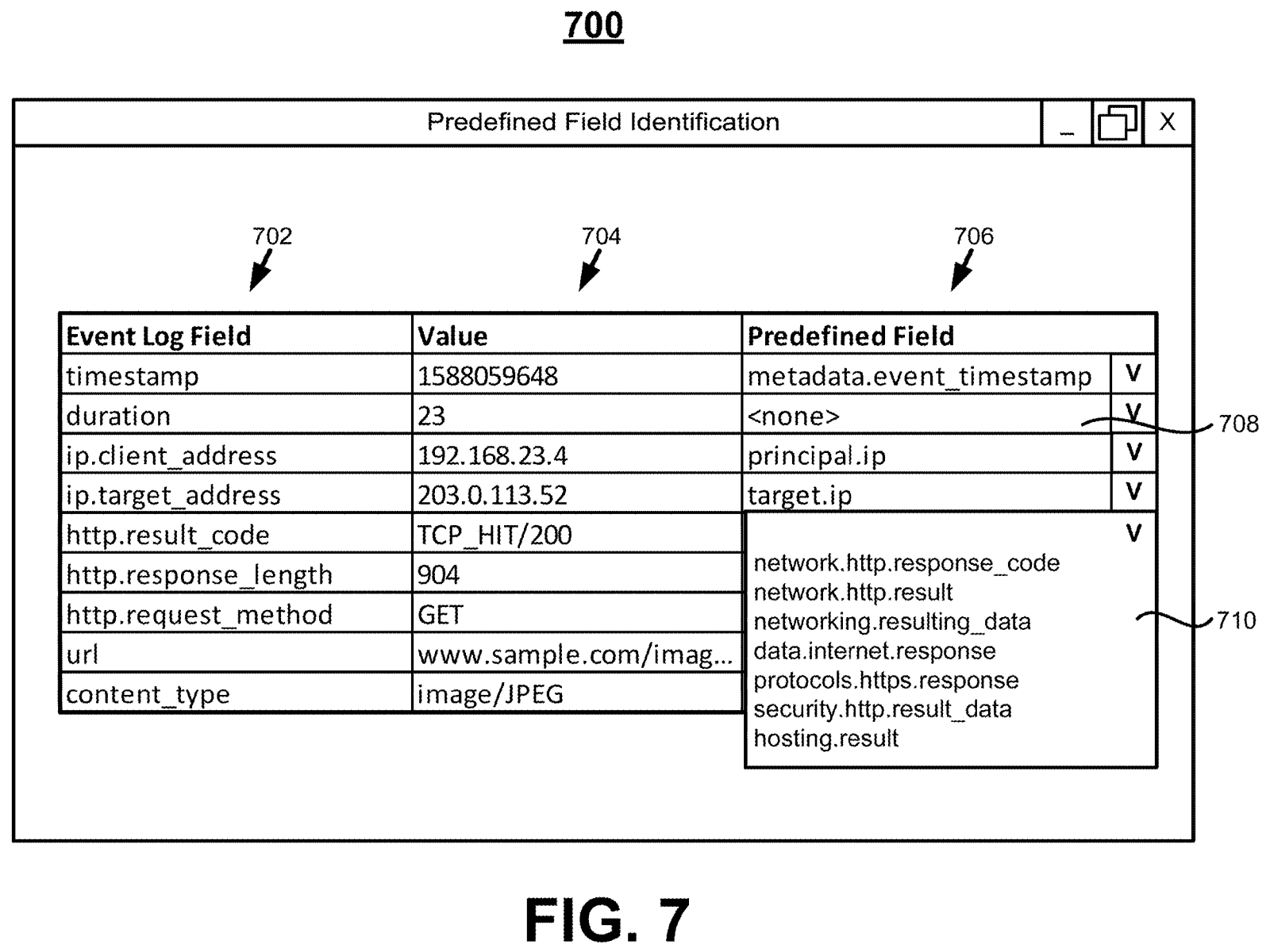

Predefined Field Identification

702 →     704 →     706 →

| Event Log Field | Value | Predefined Field | |
|---|---|---|---|
| timestamp | 1588059648 | metadata.event_timestamp | ∨ |
| duration | 23 | <none> | ∨ |
| ip.client_address | 192.168.23.4 | principal.ip | ∨ |
| ip.target_address | 203.0.113.52 | target.ip | ∨ |
| http.result_code | TCP_HIT/200 | | ∨ |
| http.response_length | 904 | | |
| http.request_method | GET | | |
| url | www.sample.com/imag... | | |
| content_type | image/JPEG | | |

708 →
710 → network.http.response_code
network.http.result
networking.resulting_data
data.internet.response
protocols.https.response
security.http.result_data
hosting.result

FIG. 7

ARTIFICIAL INTELLIGENCE-BASED AUTOMATED EVENT LOG MAPPING

TECHNICAL FIELD

The instant specification generally relates to computing devices. More specifically, the instant specification relates to artificial intelligence-based automated event log mapping.

BACKGROUND

Computing devices-including servers, storage devices, or network devices—and software applications generate event logs in response to certain actions that occur on the computing devices or in the applications. The actions can include an operating system event, an error generated by a software application, or other actions that can occur on a computing device or in an application. An event log often takes the form of a key-value pair where the key can include text that indicates what the corresponding value means. Data analytics platforms can analyze these event logs to determine a variety of phenomena that can occur on the computing devices or in the software applications, including identifying trends regarding use of the computing devices or identifying malicious activity such as a cyberattack.

SUMMARY

Disclosed herein are systems and methods for automatically mapping event log data using artificial intelligence (AI). One aspect of the disclosure includes a method. The method may include obtaining an event log of one or more event logs of telemetry data. The event log may include one or more event log key-value pairs. The method may include identifying, from among one or more predefined fields and by using an AI model, a predefined field for an event log key of an event log key-value pair of the one or more event log key-value pairs. The method may include generating, using the AI model, a confidence score associated with the predefined field. The method may include, responsive to the confidence score satisfying a threshold confidence score criterion, mapping a value of the event log key-value pair to the predefined field.

Another aspect of the disclosure includes a system. The system may include a memory and at least one processing device, coupled to the memory, configured to perform operations. The operations may include obtaining an event log of one or more event logs of telemetry data. The event log may include one or more event log key-value pairs. The operations may include identifying, from among one or more predefined fields and by using an AI model, a predefined field for an event log key of an event log key-value pair of the one or more event log key-value pairs. The operations may include generating, using the AI model, a confidence score associated with the predefined field. The operations may include, responsive to the confidence score satisfying a threshold confidence score criterion, mapping a value of the event log key-value pair to the predefined field.

Another aspect of the disclosure includes another method. The method may include obtaining an event log of one or more event logs of telemetry data. The event log may include one or more event log key-value pairs. The method may include selecting, from among one or more AI models and based on the event log, an AI model. The method may include identifying, from among one or more predefined fields and by using the AI model, a predefined field for an event log key of an event log key-value pair of the one or more event log key-value pairs. The method may include generating, using the AI model, a confidence score associated with the predefined field. The method may include, responsive to the confidence score satisfying a threshold confidence score criterion, mapping a value of the event log key-value pair to the predefined field.

BRIEF DESCRIPTION OF THE DRA WINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 1 schematically illustrates an example system for AI-based automated event log mapping in which some aspects of the present disclosure may be implemented, in accordance with various embodiments.

FIG. 2A schematically illustrates another example system for AI-based automated event log mapping in which some aspects of the present disclosure may be implemented, in accordance with various embodiments.

FIG. 2B schematically illustrates another example system for AI-based automated event log mapping in which some aspects of the present disclosure may be implemented, in accordance with various embodiments.

FIG. 3 depicts a flowchart illustrating an example method for practicing some aspects of the present disclosure, in accordance with various embodiments.

FIG. 4A schematically illustrates an example event log in which some aspects of the present disclosure may be implemented, in accordance with various embodiments.

FIG. 4B schematically illustrates an example set of mappings in which some aspects of the present disclosure may be implemented, in accordance with various embodiments.

FIG. 5 schematically illustrates an example AI subsystem for AI-based automated event log mapping in which some aspects of the present disclosure may be implemented, in accordance with various embodiments.

FIG. 6 schematically illustrates an example data object in which some aspects of the present disclosure may be implemented, in accordance with various embodiments.

FIG. 7 schematically illustrates an example user interface for identifying predefined fields in which some aspects of the present disclosure may be implemented, in accordance with various embodiments.

DETAILED DESCRIPTION

Figure 1:
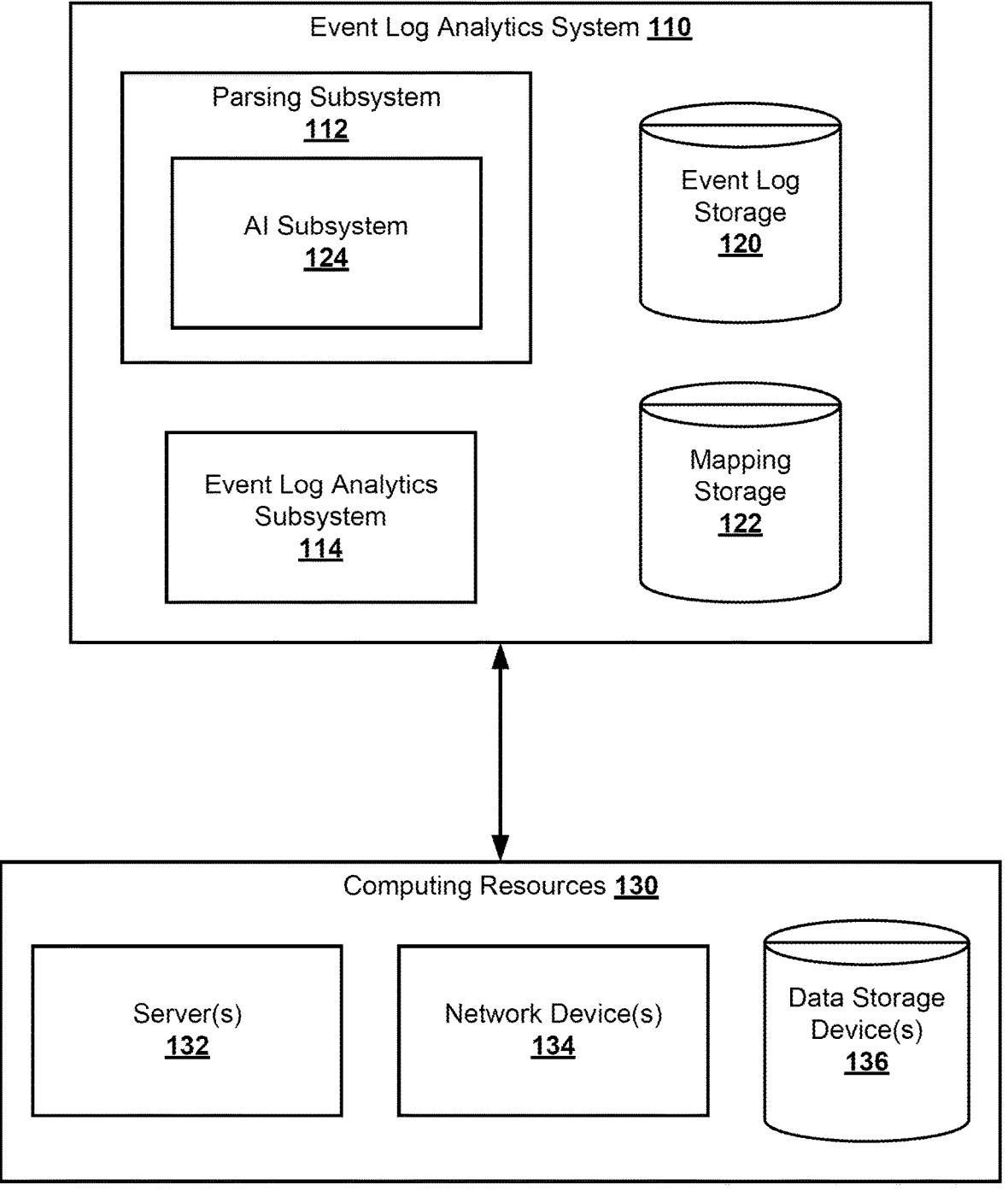

Computing networks-which can include computing devices, network devices, other types of devices, and software applications-generate event logs in response to certain actions that occur in the network. The actions can include an operating system event, an error generated by a software application, or other actions that can occur in the network. Data analytics platforms can analyze these event logs to determine a variety of phenomena that can occur in the computing network, such as identifying trends regarding use of the computing devices in the network or identifying malicious activity such as a cyberattack on the network.

Event logs can come in many formats and take a variety of forms, depending on the vendor of the device that generated the event log, the model of the device, the vendor of the software application, the version of the application, or the type of event represented by the event log. In some cases, two different devices or applications that perform similar functionality can generate event logs in very different formats for the same or similar events. In order for a data analytics platform to intelligently analyze event logs, the data analytics platform can convert event logs into a predefined schema.

The data analytics platform can use event log parsers (sometimes referred to, herein, simply as "parsers") to convert event logs to the predefined schema. A parser may include a piece of software configured to accept an event log as input and convert the event log into a data object that complies with the predefined schema. The data analytics platform can also use event log parser extensions (sometimes referred to, herein, simply as "parser extensions") to augment a parser's functionality and capabilities. A parser extension may include a piece of software configured to accept an event log as input, extract certain data from the event log (which may include data a parser that executed on the same event log did not convert into the predefined schema), and insert it into the data object. In some implementations, a parser may be implemented by parser code, which may include computer-executable instructions. Computer-executable instructions may include binary machine code, assembly code, or other similar code. In certain implementations, the parser code may include human-readable source code. The source code may be configured to be compiled into computer-executable instructions.

However, with the large number of devices and software applications available, it is sometimes difficult for the operator of the data analytics platform to manually create new event log parsers and parser extensions for new and modified event logs from new and modified devices and software applications. Also, because a parser may be software code-based, users of the data analytics platform may not have the technical knowledge or experience to create or modify a parser. Thus, a data analytics platform's parsers may not be able to handle the desired event logs, which can lead to the data analytics platform being unable to provide data analysis insights to some event logs, which may lead to computational inefficiencies by the devices generating the event logs. In some cases, the data analytics platform may be unable to recognize malicious activity such as security breaches or cyberattacks on devices that generate some event logs, exposing these devices to downtime or malware.

Aspects and implementations of the present disclosure address the above deficiencies, among others, by providing an event log analytics system capable of mapping event log data to a predefined schema using artificial intelligence (AI) techniques. The event log analytics system can ingest an event log, and the event log can include one or more event log key-value pairs, each with an event log key and a corresponding value. The event log analytics system can use an AI model to identify predefined fields in the predefined schema, and the event log analytics system can map the values of the event log key-value pair to those identified predefined fields. The AI model can also generate a confidence score associated with each predefined field, which can indicate the likelihood that the AI model's mapping of a value to an identified predefined field is correct. Responsive to a confidence score satisfying a threshold confidence score criterion (e.g., the confidence score exceeding a threshold confidence score associated with the threshold confidence score criterion), the event log analytics system can map the value to the identified predefined field. Responsive to the confidence score being below a threshold confidence score associated with the threshold confidence score criterion, the event log analytics system can use an event log parser to perform the mapping, or the event log analytics system can prompt a user of the system to provide user input that identifies the predefined field.

Some benefits of the present disclosure may include providing a system that can automatically map event log information to the predefined schema without input from a person. Instead, the AI model can identify the event log key-to-predefined field mappings, and the event log analytics system can generate data objects that implement those mappings. As a consequence, the system reduces the time spent by a person writing parser code, which reduces the time between the introduction of a new type of event log and the event log analytics system's ability to convert the new type of event log to the system's predefined schema. Additionally, mappings generated using an AI model include fewer human errors.

In addition, some benefits of the present disclosure may provide a technical effect caused by or resulting from a technical solution to a technical problem. For example, one technical problem may relate to the inability of a data analytics platform to analyze event logs from certain devices because the devices are new or have been modified and, thus, existing parsers cannot recognize certain data in the event logs and, thus, do not capture such data. One of the technical solutions to the technical problem may include using an AI model to generate event log keys-to-predefined fields mappings to capture the previously uncaptured event log data. As a consequence, the inability of a data analytics platform to capture important data in the event logs is reduced or eliminated.

Another technical problem may relate to the improper configuration of certain devices in a computing network. The improper configuration may result in inefficient usage of computing resources (including processing device usage, memory usage, storage usage, or network traffic). One of the technical solutions to the technical problem may include using AI models to convert event logs from the devices in the computing network into a predefined format. The event log analytics system can then analyze the converted event log data in the predefined format to identify alternative configurations that are more efficient. As a consequence, computing resources used by the computing network are reduced and computing resource usage is more efficient.

Another technical problem may relate to the improper configuration of the computing network resulting in the network being exposed to cyberattacks. One of the technical solutions to the technical problem may include using AI models to convert event logs from the devices in the computing network into a predefined format. The event log analytics system can then analyze the standardized event log data to identify cyberattack attempts. As a consequence, the operator of the computer network can take actions to prevent the cyberattacks or reduce their impact on the network, and effects of cyberattacks on the network are reduced or eliminated.

FIG. 1 is a schematic block diagram illustrating an example system 100 for AI-based event log mapping in which some aspects of the present disclosure may be implemented, in accordance with various embodiments. The system 100 may include an event log analytics system 110. The event log analytics system 110 may include a parsing subsystem 112, an event log analytics subsystem 114, an event log storage 120, or a mapping storage 122. The parsing subsystem 112 may include an AI subsystem 124. The system 100 may include computing resources 130. The computing resources 130 may include one or more servers 132, one or more network devices 134, or one or more data storage devices 136. The event log analytics system 110 and the computing resources 130 may be in data communication with each other over a data network.

In some implementations, the event log analytics system 110 may include a computing network that includes one or more computing devices. The event log analytics system 110 may be configured to receive event log data from the computing resources 130, use parsers and parser extensions to convert the event log data into a predefined format and perform data analytics operations on the event log data in the predefined format.

In some implementations, a computing device may include a physical computing device or may include a virtualized component, such as a virtual machine (VM) or a container. A computing device may include an instance of a computing device. An instance of a computing device may include a spun-up instance that may not be specific to any computing device. In some implementations, a VM may include a system virtual machine, which may include a VM that emulates an entire physical computing device. A VM can include a process virtual machine, which may include a VM that emulates an application or some other software. A container may include a computing environment that logically surrounds one or more software applications independently of other applications executing in the cloud computing environment.

In some cases, the event log analytics system 110 may include a cloud computing system. A cloud computing system may include one or more computing devices (or portions of cloud computing devices) provided to an end user by a cloud provider. An end user of the environment may utilize a portion of the cloud computing system to host content for use or access by other parties or perform other computational tasks. In some implementations, the cloud computing system may be configured to allow the end user to use a portion of a computing device (e.g., only certain hardware, software, or other computer system resources). The cloud computing environment may include a private cloud, a public cloud, or a hybrid cloud. The cloud computing environment may provide infrastructure-as-a-service (IaaS), platform-as-a-service (PaaS), or software-as-a-service (SaaS) computing. The cloud computing environment may provide serverless computing.

In one implementation, the parsing subsystem 112 may include one or more software applications configured to parse event logs. The parsing subsystem 112 can use one or more AI models of the AI subsystem 124 to parse event logs. A user of the computing resources 130 can use a user interface on a computing device of the computing resources 130 that is in data communication with the parsing subsystem 112 to cause the parsing subsystem 112 to parse event logs.

In one implementation, the AI subsystem 124 may include one or more software applications configured to train and/or execute one or more AI models. An AI model may be configured to identify predefined fields to which event log keys should map, generate confidence scores for those mappings, and perform other event log mapping operations.

An AI model can perform other operations related to event log data. Further details regarding the AI subsystem 124 are described herein.

The event log analytics subsystem 114 may include one or more software applications configured to perform data analytics operations and other operations on the converted event log data to identify trends in the data, determine improved configurations for devices in the computing resources 130 that provide event log data, and perform other operations on the converted event log data. A user of the computing resources 130 can use a user interface of a computing device of the computing resources 130 that is in data communication with the event log analytics subsystem 114 to view the results of the data analytics and other operations.

In some implementations, the event log storage 120 or the mapping storage 122 may include a data store. A data store may include a physical storage medium that can include volatile storage (e.g., random access memory (RAM), etc.) or non-volatile storage (e.g., a hard disk drive (HDD), flash memory, etc.). A data store can include a file system, a database, or some other software configured to store data.

In one implementation, the event log storage 120 may include a data store configured to store event log data. The stored event log data may include event logs prior to being operated on by the parsing subsystem 112 (sometimes referred to, herein, as "raw event logs") or may include event logs in a predefined format (e.g., event logs that comply with the predefined schema of the event log analytics system 110). The event log storage 120 can provide raw event logs to the parsing subsystem 112, the parsing subsystem 112 can convert the raw event logs to a predefined format and store the converted event log data in the event log storage 120. The event log storage 120 can provide converted event log data in the predefined format to the event log analytics subsystem 114 for analysis.

The mapping storage 122 may include a data store configured to mappings from event log keys to predefined fields. The event log keys may include event log keys from raw event logs. Predefined fields may include fields that form part of the event log analytics system's 110 predefined schema.

In one or more implementations, the computing resources 130 may include a computing network. The computing resources 130 may include a computing network operated by a customer of the entity that operates the event log analytics system 110 and provides event log analytics services to the customer. The computing resources 130 may include one or more servers 132. A server 132 may include a computing device, including a physical computing device or a VM. The computing resources 130 may include one or more network devices 134. A network device 134 may include a switch, router, hub, gateway, wireless access point, bridge, modem, repeater, or other network devices. A network device 134 can help provide data communication between the one or more servers 132, between other devices of the computing resources 130, or between a computing device external to the computing resources 130 and a device of the computing resources 130. The computing resources 130 may include one or more data storage devices 136. A data storage device 136 may include a data store. One or more servers 132 or other computing devices of the computing resources 130 may store data on the one or more data storage devices 136 or retrieve data from the one or more data storage devices 136.

In one or more implementations, a computing network of the event log analytics system 110 or the computing resources 130 may include one or more computing devices in data communication with each other over a data network. The data network may include a local area network (LAN), wide area network (WAN), a virtual private network (VPN), or some other data network. The data network may include network devices, including switches, routers, hubs, gateways, wireless access points, bridges, modems, repeaters, or other network devices.

Figure 2A:
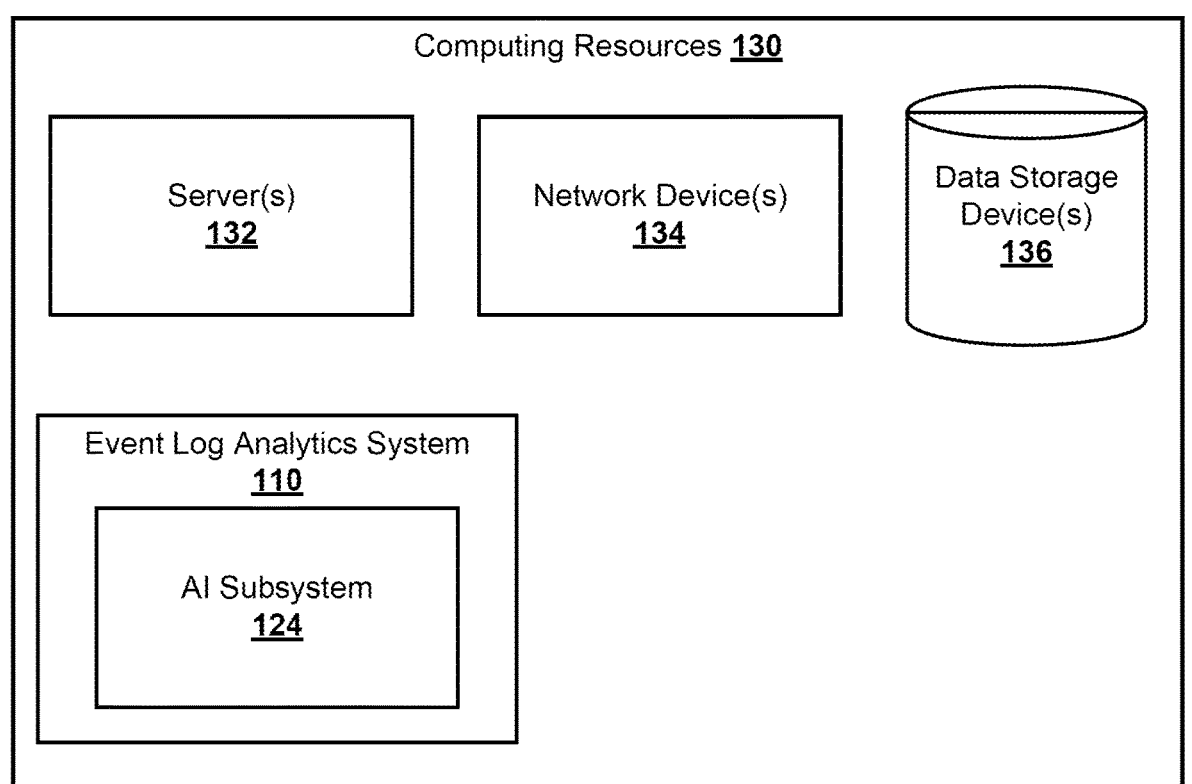

In some implementations, the event log analytics system 110 and the computing resources 130 may be separate computing networks and can communicate with each other over a data network. However, as seen in the example system 200 of FIG. 2A, in certain implementations, the computing resources 130 may include the event log analytics system 110. For example, the components of the event log analytics system 110 may be installed on one or more computing devices of the computing resources 130. The event log analytics system 110 can provide its functions locally to the computing resources 130. As seen in the example system 250 of FIG. 2B, in one or more implementations, a cloud computing system 210 may include the event log analytics system 110 and one or more sets of computing resources 130-1, . . . , 130-n. The one or more sets of computing resources 130-1, . . . , 130-n may be cloud computing environments provided by the cloud provider of the cloud computing system 210, and the cloud provider can operate the event log analytics system 110 and allow the one or more sets of computing resources 130-1, . . . , 130-n to use the event log analytics system's 110 functionality. The cloud computing system 210 may include a cloud management system 212, which may include one or more computing devices or software configured to manage the cloud computing system 210, including provisioning one or more sets of computing resources 130-1, . . . , 130-n to users or coordinate usage of the event log analytics system 110 by the one or more sets of computing resources 130-1, . . . , 130-n.

In implementations of the disclosure, a "user" can be represented as a single individual. However, other implementations of the disclosure encompass a "user" being an entity controlled by a set of users or an organization and/or an automated source such as a system or a platform. In situations in which the systems discussed here collect personal information about users, or can make use of personal information, the users can be provided with an opportunity to control whether event log analytics system 110 collects user information (e.g., information about a user's social network, social actions or activities, profession, a user's preferences, or a user's current location), or to control whether and/or how to receive content from the event log analytics system 110 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the event log analytics system 110.

Figure 3:
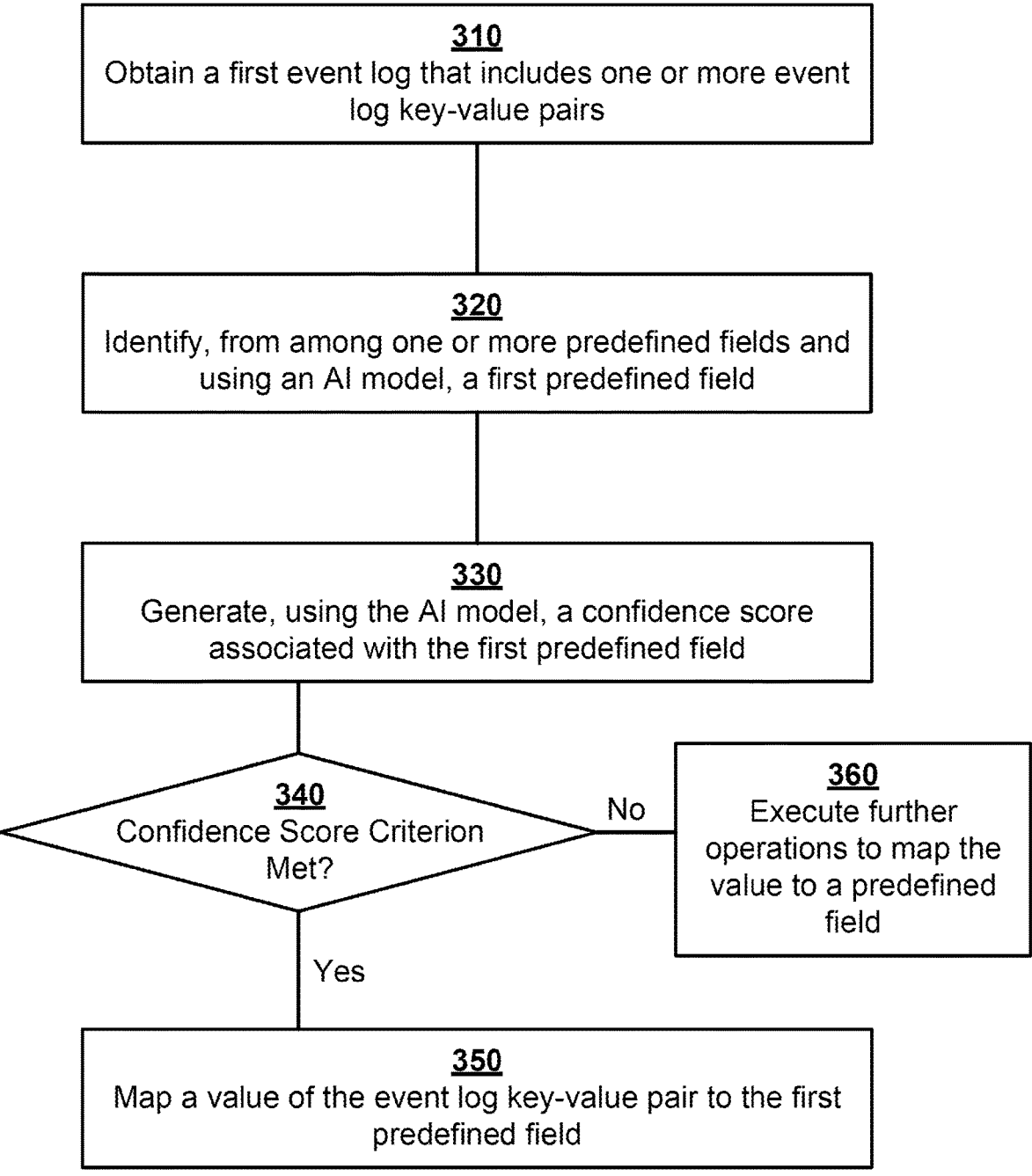

FIG. 3 is a flowchart illustrating one embodiment of a method 300 for AI-based automated event log mapping, in accordance with some implementations of the present disclosure. A processing device, having one or more central processing units (CPU(s)) and/or memory devices communicatively coupled to the CPU(s) and/or graphics processing units (GPU(s)) can perform the method 300 and/or each of their individual functions, routines, subroutines, or operations. In certain implementations, a single processing thread can perform the method 300. Alternatively, two or more processing threads can perform the method 300, each thread executing one or more individual functions, routines, subroutines, or operations of the method. In an illustrative example, the processing threads implementing the method 300 can be synchronized (e.g., using semaphores, critical sections, and/or other thread synchronization mechanisms). Alternatively, the processing threads implementing the method 300 can be executed asynchronously with respect to each other. Various operations of the method 300 can be performed in a different (e.g., reversed) order compared with the order shown in FIG. 3. Some operations of the method 300 can be performed concurrently with other operations. Some operations can be optional. In some embodiments, the parsing subsystem 112, the AI subsystem 124, or the event log analytics subsystem 114 can perform one or more operations of the method 300.

At block 310, processing logic obtains a first event log. The first event log may include an event log of one or more first event logs of first telemetry log data. The telemetry data may include one or more event logs. The first event log may include one or more event log key-value pairs.

In some implementations, telemetry log data may include data generated by a device or a component of a device regarding metrics, measurements, events, or other things of a device or component during execution. In some implementations, telemetry log data may include one or more event logs. In one or more implementations, an event log may include a data record that represents an event related to a device or software of the computing resources 130. A device (including a component of a device) can generate the event log, or software can generate the event log. The event log may include data about the event represented by the event log. In some implementations, an event log may include a structured event log. A structured event log may include event data in a structured format. Event data in a structured format may include data that is organized into a recognized format. The structured event log may include event data in a Javascript Object Notation (JSON) format, an Extensible Mark-up Language (XML) format, a comma-separated values (CSV) format, or event data in some other structured format. In one or more implementations, some of the telemetry log data may include data in an unstructured format. Data in an unstructured format may include data that is not organized into a recognized format. In some implementations, the unstructured format may include a syslog header that contains a structured event log.

In one implementation, telemetry log data may include security telemetry log data, which may include one or more event logs that provide information about security-related events of a computing device. The one or more event logs may include raw event logs, e.g., event logs that have not yet been converted to a predefined format by the parsing subsystem 112. The telemetry log data may include telemetry log data provided to the event log analytics system 110 by the computing resources 130. The event log storage 120 can store the telemetry log data.

In some implementations, an event log may include one or more event log key-value pairs. An event log key-value pair may include an event log key and a value that corresponds to that event log key. An event log key may include data that indicates a category of data, and the corresponding value may include data that belongs to that category.

FIG. 4A depicts an example event log 400. The event log 400 may include a web proxy-type event log. The example event log 400 may represent the event of a computing device requesting a web resource on a server 132. The event log 400 can include one or more key-value pairs 402-1, . . . , 402-9. A key-value pair 402 may include a key 404 and a corresponding value 406. The key-value pairs 402-1, . . . , 402-9 of an event log 400 may include data that provide information about the event represented by the event log 400. For example, as depicted in FIG. 4A, the key-value pair 402-1 may include a "timestamp" key 404-1 and a corresponding value 406-1 of "1588059648.129," which may represent a timestamp of when the event represented by the event log 400 occurred or when the event log 400 was generated (e.g., in the example event log 400 of FIG. 4A, the value 406-1 may include a timestamp in the UNIX epoch format). The key-value pair 402-2 may include a "duration" key 404-2 and a value 406-2 of "23," which may represent a duration of the event represented by the event log 400 (e.g., in the example event log 400, the value 406-2 may be provided in milliseconds). The key-value pair 402-3 may include a "ip.client_address" key 404-3 and the value 406-3 of "192.168.23.4," which may represent the Internet Protocol (IP) address of the device that initiated the event represented by the event log 400. The key-value pair 402-4 may include a "ip.target_address" key 404-4 and the corresponding value 406-4 of "203.0.113.52," which may represent the IP address of the device that hosts the requested web resource requested in the event log 400. The key-value pair 402-5 may include a "http.result_code" key 404-5 and a corresponding value 406-5 of "TCP_HIT/200," which may represent the result code of the event represented by the event log 400 The key-value pair 402-6 may include a "http.response_length" key 404-6 and the corresponding value 406-6 of "904," which may represent a length, in bytes, of the received request for the web resource. The key-value pair 402-7 may include a "http.request_method" key 404-7 and the corresponding value "GET." The key-value pair 402-8 may include a "URL" key 404-8 and the corresponding value 406-8 "www.sample.com/image/logo.png," which may represent a uniform resource locator (URL) of a requested web resource of the event represented by the event log 400. The key-value pairs 402-9 may include a "content_type" key 404-9 and a corresponding value 406-9 of "image/JPEG," which may indicate the type of the content requested in the event of the event log 400.

In some implementations, an event log 400 may have more or fewer key-value pairs 402 than shown in FIG. 4A. An event log 400 may have different key-value pairs 402. As can be seen in FIG. 4A, in some implementations, an event log 400 may have key-value pairs 402 at different levels. For example, the "timestamp" key-value pair 402-1 may occur at a first level, and the "ip.client_address" key-value pair 402-3 may occur at a second level that is nested inside a first level. In one implementation, the parsing subsystem 112 may identify the one or more key-value pairs 402-1, . . . , 402-9 of an event log 400. Identifying the one or more key-value pairs 402-1, . . . , 402-9 may include traversing a structure of the event log 400 and parsing the structure into different pieces of data.

Returning to FIG. 3, at block 320, processing logic identifies, from among one or more predefined fields and by using an AI model, a first predetermined field for an event log key 404. The event log key 404 may include an event log key 404 of an event log key-value pair 402 of the one or more event log key-value pairs 402 of the first event log 400.

As discussed above, the event log analytics subsystem 114 can use event logs in a standardized, predefined format that includes predefined fields, but different devices can provide raw event log data that is not in the predefined format. Thus, the parsing subsystem 112 can use an AI model to assist the parsing subsystem 112 to convert the raw event log 400 data into the predefined format. Part of that parsing may include mapping event log keys 404 in a raw event log 400 to predefined fields.

In one or more implementations, a predefined field may include a data field in a predefined, standardized format. The predefined format may include the predefined schema of the event log analytics system 110. The predefined schema may include a format compatible with event log analytics functions of the event log analytics subsystem 114. In one implementation, the event log analytics system 110 may include multiple predefined fields. The multiple predefined fields can be stored by the parsing subsystem 112 (e.g., in the mapping storage 122). The event log analytics system 110 can store the multiple predefined fields in a data structure (e.g., a list, a set, or some other data structure). The predefined fields may include predefined data fields recognized by the event log analytics subsystem 114.

In one embodiment, at block 320, an AI model can identify a predefined field 434 to which an event log key 404 maps. FIG. 4B depicts an example set 430 of mappings 432-1, . . . , 432-7 for the event log 400 of FIG. 4A. The set 430 of mappings 432-1, . . . , 432-7 may include one or more mappings 432 that indicate which event log keys 404 of the raw event log 400 map to which predefined field 434 of the predefined format. For example, the "timestamp" key 404-1 of the event log 400 can map to the predefined field 434-1 "metadata.event_timestamp." The "ip.client_address" key 404-3 can map to the predefined field 434-2 "principal.ip," the "ip.target_address" key 404-4 can map to the predefined field 434-3 "target.ip," the "http.result_code" key 404-5 can map to the predefined field 434-4 "network.http.response_code," the "http.response_length" key 404-6 can map to the predefined field 434-5 "network.http.received_bytes," the event log key 404-7 "http.request_method" can map to the predefined field 434-6 "network.http.method," and the key 404-8 "URL" can map to the predefined field 434-7 "target.url."

As can be seen from the example set 430 of mappings 432-1, . . . , 432-7 of FIG. 4B, in some implementations, certain keys 404 in an event log 400 may not map to a predefined field 434. For example, the "duration" key 404-2 and the "content_type" key 404-9 may not map to corresponding predefined fields 434. This may result from the event log analytics subsystem 114 not needing the data stored in these key-value pairs 402. In one or more implementations, an event log key 404 may include the same name as the corresponding predefined field 434, or an event log key 404 may include a different name from the corresponding predefined field 434.

In some implementations, the event log storage 120 may include data indicating a predefined event type. Similar to how a predefined field includes data in a predefined, standardized format, a predefined event type can include data in a predefined, standardized format that provides information about a type of event that occurred on a computing device or in a software application. In this manner, the event log analytics system 110 may include a standard way to represent an event type, even when different raw logs 400 indicate the same event type in different ways. For example, as mentioned above, the event type for the example event log 400 of FIG. 4A is a computing device requesting a web resource on a server. Different event logs 400 from different computing devices may represent this type of event in different ways, but the event logs analytics system 110 may represent this event type using predefined, standardized data.

Figure 5:
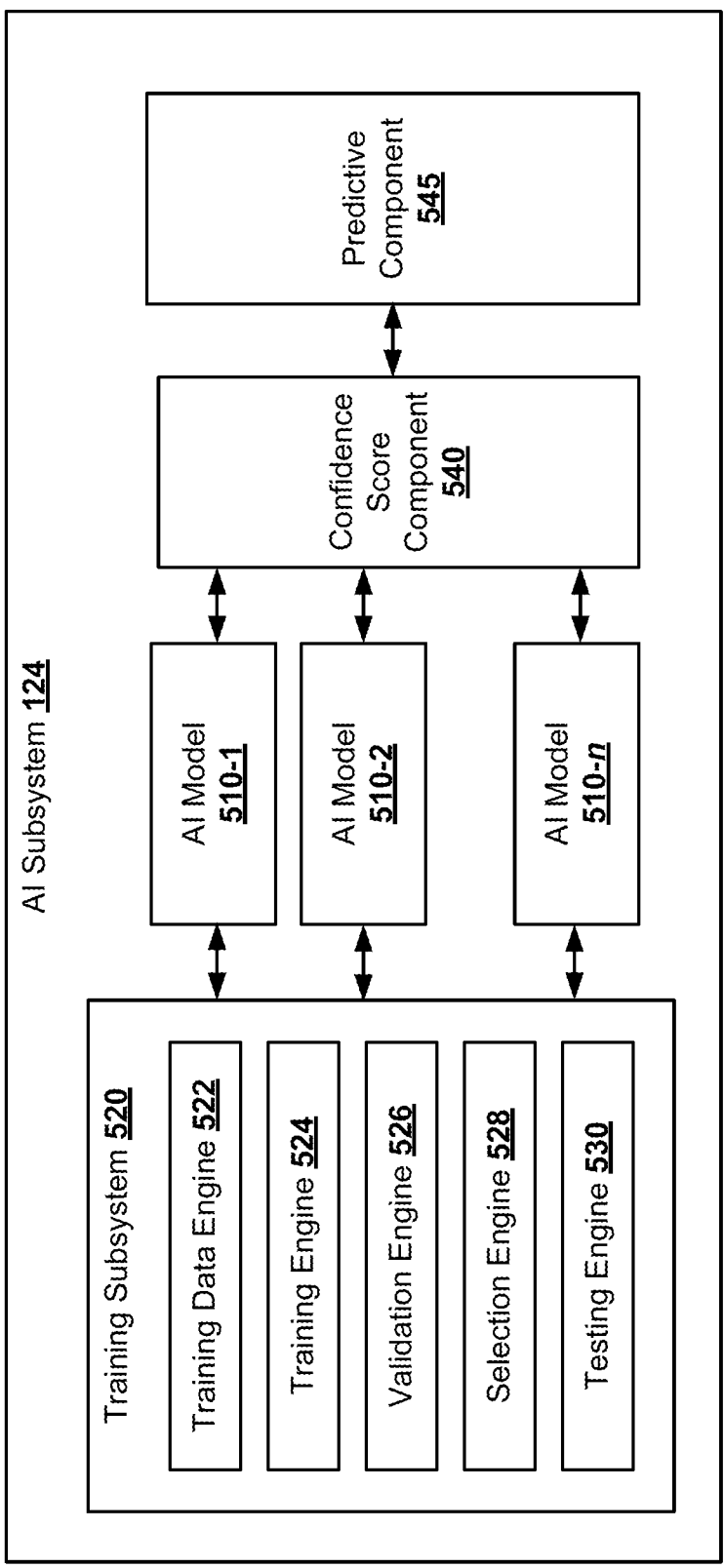

As discussed above, in block 320 of the method 300, the parsing subsystem 112 uses an AI model of the AI subsystem 124 to identify a predefined field 434 to which an event log key 404 (or its corresponding value 406) should map. FIG. 5 illustrates an example AI subsystem 124, in accordance with implementations of the present disclosure. As illustrated in FIG. 5, the AI subsystem 124 can include one or more AI models 510-1, . . . , 510-n. The AI subsystem 124 may include a training subsystem 520, which may include a training data engine 522, a training engine 524, a validation engine 526, a selection engine 528, or a testing engine 530. The AI subsystem 124 may include a confidence score component 540. The AI subsystem 124 may include a predictive component 545. In some embodiments, the AI subsystem 124 may not be part the parsing subsystem 112 and may instead be part of another system or sub-system or be an independent system, and may only include the training subsystem 520 that can train AI models 510-1, . . . , 510-n and provide them to the parsing subsystem 112, which may include the trained AI models 510-1, . . . , 510-n, and the confidence score component 540 and the predictive component 545.

In one embodiment, an AI model 510 may include one or more artificial neural networks (ANNs), decision trees, random forests, support vector machines (SVMs), clustering-based models, Bayesian networks, or other types of machine learning models. ANNs generally include a feature representation component with a classifier or regression layers that map features to a target output space. The ANN can include multiple nodes ("neurons") arranged in one or more layers, and a neuron may be connected to one or more neurons via one or more edges ("synapses"). The synapses can perpetuate a signal from one neuron to another, and a weight, bias, or other configuration of a neuron or synapse can adjust a value of the signal. Training the ANN may include adjusting the weights or other features of the ANN based on an output produced by the ANN during training.

An ANN may include, for example, a convolutional neural network (CNN), recurrent neural network (RNN), or a deep neural network. A CNN, a specific type of ANN, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). A deep network may include an ANN with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. An RNN is a type of ANN that includes a memory to enable the ANN to capture temporal dependencies. An RNN is able to learn input-output mappings that depend on both a current input and past inputs. The RNN will address past and future measurements and make predictions based on this continuous measurement information. One type of RNN that may be used is a long short term memory (LSTM) neural network.

ANNs can learn in a supervised (e.g., classification) or unsupervised (e.g., pattern analysis) manner. Some ANNs (e.g., such as deep neural networks) may include a hierarchy of layers, where the different layers learn different levels of representations that correspond to different levels of abstraction. In deep learning, each level learns to transform its input data into a slightly more abstract and composite representation.

In one embodiment, an AI model 510 may include a generative AI model. A generative AI model can deviate from a machine learning model based on the generative AI model's ability to generate new, original data, rather than making predictions based on existing data patterns. A generative AI model can include a generative adversarial network (GAN), a variational autoencoder (VAE), or a large language model (LLM). In some instances, a generative AI model can employ a different approach to training or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

In some embodiments, an AI model 510 can be an AI model that has been trained on a corpus of data. In some embodiments, the AI model 510 can be a model that is first pre-trained on a corpus of data to create a foundational model, and afterwards fine-tuned on more data pertaining to a particular set of tasks to create a more task-specific, or targeted, model. The foundational model can first be pre-trained using a corpus of data that can include data in the public domain, licensed content, and/or proprietary content. Such a pre-training can be used by the AI model 510 to learn broad elements including, image or speech recognition, general sentence structure, common phrases, vocabulary, natural language structure, and other elements. In some embodiments, this first, foundational model can be trained using self-supervision, or unsupervised training on such datasets.

In some embodiments, the AI model 510 can then be further trained or fine-tuned on organizational data, including proprietary organizational data. The AI model 510 can also be further trained or fine-tuned on event logs 400, event log parser code, predefined fields 434, event log key 404-to-predefined field 434 mappings, or other data stored by the mapping storage 122.

In some embodiments, the second portion of training, including fine-tuning, may be unsupervised, supervised, reinforced, or any other type of training. In some embodiments, this second portion of training may include some elements of supervision, including learning techniques incorporating human or machine-generated feedback, undergoing training according to a set of guidelines, or training on a previously labeled set of data, etc. In a non-limiting example associated with reinforcement learning, the outputs of the AI model 510 while training may be ranked by a user, according to a variety of factors, including accuracy, helpfulness, veracity, acceptability, or any other metric useful in the fine-tuning portion of training. In this manner, the AI model 510 can learn to favor these and any other factors relevant to users when generating a response. Further details regarding training are provided below.

In some embodiments, an AI model 510 may include one or more pre-trained models, or fine-tuned models. In a non-limiting example, in some embodiments, the goal of the "fine-tuning" may be accomplished with a second, or third, or any number of additional models. For example, the outputs of the pre-trained model may be input into a second AI model 510 that has been trained in a similar manner as the "fine-tuned" portion of training. In such a way, two more AI models 510 may accomplish work similar to one AI model 510 that has been pre-trained, and then fine-tuned.

As indicated above, an AI model 510 may be one or more generative AI models, allowing for the generation of new and original content. The generative AI model can use other machine learning models including an encoder-decoder architecture including one or more self-attention mechanisms, and one or more feed-forward mechanisms. In some embodiments, the generative AI model can include an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative AI model can also utilize the previously discussed deep learning techniques, including RNNs, CNNs, or transformer networks.

In some embodiments, a generative AI model 510 can include an LLM. In some embodiments, the LLM can include generative AI functionality. In such embodiments, the AI model 510 can generate new content based on provided input data (e.g., an event log 400). The generative AI model 510 can be supported by a prompt subsystem (not shown), which can reside on the AI subsystem 124. The prompt subsystem can be configured to perform automated identification of, and facilitate retrieval of, relevant and timely contextual information for efficient and accurate processing of prompts by the AI model 510. The prompt subsystem may be in communication with the mapping storage 122 or the event log storage 120. Communications between the prompt subsystem and the predictive component 545 can be facilitated by a generative model application programming interface (API), in some embodiments. Communications between the prompt subsystem and the mapping storage 122 or the event log storage 120 can be facilitated by a data management API. In additional or alternative embodiments, the generative model API can translate prompts generated by the prompt subsystem into unstructured natural-language format and, conversely, translate responses received from the AI model 510 into any suitable form (e.g., including any structured proprietary format as may be used by the prompt subsystem). Similarly, the data management API can support instructions that can be used to communicate data requests to generate parser code that maps event log keys 404 of an event log 400 to predefined fields 434 and can format data received from such components.

In some embodiments, the prompt subsystem can include a prompt analyzer to support various operations of the AI subsystem 124. For example, the prompt analyzer can receive an input (e.g., a prompt submitted by the parsing subsystem 112) and generate one or more intermediate prompts to the generative AI model 510 to determine what type of data the generative AI model may need to successfully respond to the input. Responsive to receiving a response from the generative AI model 510, the prompt analyzer can analyze the response, form a request for relevant contextual data for the mapping storage 122 or the event log storage 120, which can then supply such data. The prompt analyzer can then generate a prompt to the generative AI model 510 that includes the original prompt and the contextual data. In some embodiments, the prompt analyzer may, itself, include a lightweight generative AI model that can process the intermediate prompt(s) and determine what type of contextual data may be needed by the generative AI model 510 together with the original prompt to ensure a meaningful response from the generative AI model 510.

In one implementation, the parsing subsystem 112 can generate an LLM prompt. The LLM prompt may include the first event log 400. The LLM prompt may include a command to the AI model 510 to generate parser code to map the event log keys 404 of the first event log 400 to predefined fields 434. The LLM prompt may include context information (e.g., metadata associated with the first event log 400). The parsing subsystem 112 can submit the LLM prompt to the prompt subsystem, discussed above. The prompt subsystem can operate on the LLM prompt and provide the prompt to the predictive component 545. The predictive component 545 can input the LLM prompt into the generative AI model 510. The generative AI model 510 can generate parser code that performs the mapping of the event log keys 404 to predefined fields 434.

In some implementations, an AI model 510 may be trained on training data in order to configure the AI model 510 to automatically identify predefined fields 434 that event log keys 404 should map to. In one implementation, the training subsystem 520 can manage the training and testing of the AI model 510. The training data engine 522 can generate training data (e.g., a set of training inputs or a set of target outputs) to train the AI model 510.

In one embodiment, an AI model 510 may include a generative AI model. The generative AI model 510 may include a transformer-based LLM. The training data used to train the generative AI model may include one or more event logs 400, one or more event log keys 404 from other event logs 400, one or more portions of parser code, one or more predefined fields 434, a portion of the predefined schema used by the event log analytics system 110, a predefined event type, a data object that includes predefined fields 434 and their corresponding values 406 (discussed below regarding FIG. 6), or other data. The portions of parser code may include already-existing parser code stored by the mapping storage 122. These portions of already existing parser code may include the parser code of other event log parsers. In some cases, a predefined field 434 may include metadata that provides information about the predefined field 434. The information may include information provided by a user of the event log analytics system 110. The training data engine 522 can obtain one or more of the above categories of data from the mapping storage 122.

In one example, a piece of training data may include a raw event log 400 and the parser code that corresponds to the event log 400. The parser code may include code that was written by a user of the event log analytics system 110, parser code that was generated by an AI model (whether the AI model 510 or some other AI model), or parser code that was generated by the parsing subsystem 112 in some other way. The piece of training data may also include data indicating a corresponding predefined event type for the raw event log 400. In another example, a piece of training data may include a raw event log 400 and data indicating mappings from the event log keys 404 of the event log 400 to predefined fields 434. In another example, a piece of training data may include a raw event log 400 and a data object with predefined fields 434 and corresponding values 406, and the data object may correspond to the raw event log (e.g., a parser may have generated the data object from the raw event log 400).

In one implementation, the AI model 510 may include an ANN-based AI model 510. The training data used to train the ANN-based AI model 510 may include one or more mappings 432 from event log keys 404 to predefined fields 434. The mappings 432 can be stored by the parsing subsystem 112, the mapping storage 122, the event log storage 120, or some other storage associated with the event logs analytics system. In some implementations, for a piece of ANN-based AI model 510 training data, the training input may include an event log key 404 and the target output may include the predefined field 434 to which that event log key 404 maps.

In an illustrative example, the training data engine 522 can initialize a training set, T, to null (e.g., { }). The training data engine 522 can add the training data to the training set T and can determine whether the training set T is sufficient for training the AI model 510. The training set T can be sufficient for training the AI model 510 if the training set T includes a threshold amount of training data, in some embodiments. In response to determining that the training set T is not sufficient for training, the training data engine 522 can identify additional event logs 400, parser code, predefined fields 434, etc. to use as training data. In response to determining that the training set T is sufficient for training, the training data engine 522 can provide the training set T to the training engine 524.

The training engine 524 can train the AI model 510 using the training data (e.g., the training set T). The AI model 510 may refer to the model artifact that is created by the training engine 524 using the training data, where such training data can include training inputs and, in some implementations, corresponding target outputs (e.g., correct answers for respective training inputs). The training engine 524 can input the training data into the AI model 510 so that the AI model 510 can find patterns in the training data and configure itself based on those patterns.

Where the AI model 510 uses supervised learning, the training engine 524 can assist the AI model 510 in determining whether the AI model 510 maps the training input to the target output (the answer to be predicted or the ground truth). Where the AI model 510 uses unsupervised learning, the training engine 524 can input the training data into the AI model 510. The AI model 510 can configure itself based on the input training data, but since the training data may not include a target output, the training engine 524 may not assist the AI model 510 in determining whether the AI model 510 provided a correct output during the training process.

The validation engine 526 may be capable of validating a trained AI model 510 using a corresponding set of features of a validation set from the training data engine 522. The validation engine 526 can determine an accuracy of each of the trained AI models 510 based on the corresponding sets of features of the validation set. Where the training data may not include a target output, validating a trained AI model 510 may include obtaining an output from the AI model 510 and providing the output to another entity for evaluation. The other entity may include another AI model configured to evaluate the output of the AI model that is undergoing training. The other entity may include a human. The validation engine 526 may discard a trained AI model 510 that has an accuracy that does not meet a threshold accuracy or that otherwise fails evaluation. In some embodiments, the selection engine 528 can be capable of selecting a trained AI model 510 that has an accuracy that meets a threshold accuracy. In some embodiments, the selection engine 528 can be capable of selecting the trained AI model 510 that has the highest accuracy of multiple trained AI models 510. In some implementations, the selection engine 528 can receive input from another AI model 510 or a human and can select a trained AI model 510 based on the input.

The testing engine 530 can be capable of testing a trained AI model 510 using a corresponding set of features of a testing set from the training data engine 522. For example, a first trained AI model 510 that was trained using a first set of features of the training set can be tested using the first set of features of the testing set. The testing engine 530 can determine a trained AI model 510 that has the highest accuracy or other evaluation of all of the trained AI models 510 based on the testing sets.

In some embodiments, as part of block 320, the AI subsystem 124 can use a trained AI model 510 to identify predefined fields 434 to which event log keys 404 should map. In some implementations, the AI subsystem 124 can use the AI model 510 to map an event log key 404 to a predefined field 434. The predictive component 545 of the AI subsystem 124 can be configured to feed data as input to the AI model 510 and obtain one or more outputs. For example, in block 320, the predictive component 545 can feed an event log key 404 from an event log key-value pair 402 from the first event log 400 as input to an AI model 510. The AI model 510 can execute and identify a predefined field 434 as output.

Returning to FIG. 3, at block 330, processing logic generates, using the AI model 510, a confidence score associated with the first predefined field 434 of block 320. In some implementations, the AI subsystem 124 may include a confidence score component 540. In one or more implementations, an AI model 510 can generate a confidence score. The confidence score may include a metric indicating a confidence of the AI model 510 that the AI model's 510 output is correct. In some implementations, the AI model 510 may include the confidence score with its output predefined field 434. In other implementations, the AI model 510 can provide its confidence score separately. In some implementations, a different component of the parsing subsystem 112 or the event log analytics system 110 can generate the confidence score.

At block 340, processing logic determines whether the confidence score of block 330 satisfies a threshold confidence score criterion. In one embodiment, the confidence score component 540 compares the confidence score of block 330 to a threshold confidence score of the threshold confidence score criterion. Responsive to the confidence score satisfying the threshold confidence score criterion, at block 350, processing logic maps a value 406 of the event log key-value pair 402 of block 320 to the predefined field 434 that the AI model 510 identified in block 330. In one embodiment, satisfying the threshold confidence score criterion includes the confidence score meeting or exceeding a threshold confidence score. The threshold confidence score can be provided by a user of the event log analytics system 110. The user may include the user that controls the computing resources 130. In another implementation, the parsing subsystem 112 or some other component of the event log analytics system 110 can calculate the threshold confidence score.

In some implementations, mapping the value 406 to the predefined field 434 as part of block 350 includes the parsing subsystem 112 generating a data object. The data object may be in the standardized, predefined schema of the event log analytics system 110 and compatible with the event log analytics subsystem 114. FIG. 6 depicts an example data object 600 that represents the event log 400 converted into the predefined format according to the set 430 of mappings 432-1, . . . , 432-7 identified by an AI model 510. The data object 600 may be in the JSON format. The data object 600 may include one or more predefined field-value pairs 602-1, . . . , 602-10. Each predefined field-value pair 602 may include a predefined field 434 and a corresponding value 604. The corresponding value 604 may include a value mapped from the raw event log 400 to a predefined field 434 according to the set 430 of mappings 432-1, . . . , 432-7.

In one implementation, some of the predefined fields 434 may include predefined fields 434 from the set 430 of mappings 432. Some of the predefined fields 434 may include a predefined field 434 that is not from the set 430 of mappings. For example, as can be seen in FIG. 6, the data object 600 may include the predefined field-value pairs 602-8, 602-9, and 602-10, which may include a "metadata.event_type" predefined field 434-8 (whose value 604-8 may include data indicating the event type represented by the event log 400), a "metadata.product_name" predefined field 434-9 (whose value 604-9 may include data indicating the device or software that generated the event log 400), and a "metadata. vendor_name" predefined field 434-10 (whose value 604-10 may include data indicating the device's or software's vendor that generated the event log 400).

In some implementations, at block 350, the parsing subsystem 112 stores one or more of the mappings 432 generated by the AI model 510 in the mapping storage 122. This can allow the parsing subsystem 112 to use the one or more mappings 432 at a later time (e.g., if the parsing subsystem 112 receives another event log 400 of the same event log type).

Returning to FIG. 3, in one or more implementations, at block 340, processing logic determines that the confidence score generated in block 330 is below a threshold confidence score associated with the threshold confidence score criterion. This may indicate that the AI model 510 was not sufficiently confident in its identified predefined field 434. Responsive to the confidence score being below the threshold confidence score, at block 360, processing logic executes one or more further operations to map an event log key 404 to a predefined field 434. In one implementation, a further operation includes the parsing subsystem 112 using user input to identify the predefined field 434 to which an event log key 404 should map. The user input may include input from a user interface (UI).

FIG. 7 depicts an example UI 700 for identifying one or more predefined fields 434. The parsing subsystem 112 can display the UI 700 as part of block 330 of the method 300. The UI 700 may include one or more columns 702, 704, or 706. For example, a first column 702 can list one or more event log keys 404 of the first event log 400. A second column 704 can list the values 406 for the corresponding event log keys 404 listed in the first column 702. A third column 706 can list predefined fields 434.

In some implementations, the UI 700 can list only the event log keys 404 and corresponding values 406 for which the AI model 510 generated a confidence score below the threshold confidence score. In other implementations, the UI 700 can list all of the event log keys 404 and corresponding values 406 of the event log 400.

In some implementations, an element of the third column 706 may include a user input area 708 where a user can provide user input to identify the predefined field 434 that an event log key 404 should map to. The user input area 708 may be prepopulated with the predefined field 434 that the AI model 510 identified in block 320. In one implementation, the user input area 708 may include a list 710 of possible predefined fields 434. For example, as depicted in FIG. 7, the list 710 may include a drop-down list. The parsing subsystem 112 can determine a displayed order of the predefined fields 434 in the list 710 based on the confidence score generated by the AI model 510 and associated with that predefined field 434. The list 710 may be in order from highest confidence score to lowest. The list 710 can allow a user of the UI 700 to select predefined field 434 in the list 710, and the parsing subsystem 112 can map the event log key 404 to the selected predefined field 434. The user input area 708, in some embodiments, allows the user to enter a text data input to be used as the predefined field 434.

In response to the user interacting with a "Finish" or "Submit" button of the UI 700, the UI 700 can send the predefined fields 434 in the third column 706 to the parsing subsystem 112 to generate the mappings 432. In some implementations, one or more predefined fields 434 in the third column 706 (whether identified by the AI model 510 or input by a user of the UI 700) can be used by the AI subsystem 124 to generate training data or other data that the AI subsystem 124 can use to update the AI model 510.

Returning to FIG. 3, in one implementation, a further operation of the block 360 includes the parsing subsystem 112 executing an event log parser or parser extension that maps the value 406 to a predefined field 434. The parser or parser extension can identify the predefined field 434 to which the event log key 404 or the value 406 maps. The parser or parser extension may be configured to accept at least a portion of an event log 400 (e.g., an event log key-value pair 402) as input and identify a predefined field 434 to which the event log key 404 or value 406 maps as output. The parser or parser extension may be configured to perform other event log processing-related functionality.

A parser extension can include data, code, a software application, or other data configured to be executed by the parsing subsystem 112. A parser extension may be configured to augment the functionality of an AI model 510 or a parser or may be configured to augment the data that an AI model 510 or a parser can operate on when executing on an event log 400. The parser extension may be configured to accept at least a portion of an event log 400 as input and identify a predefined field 434 to which the event log key 404 or value 406 maps as output. The parser extension may be configured to perform other event log-related operations. In one or more implementations, the parsing subsystem 112 can select a parser or parser extension to execute. In some implementations, the parsing subsystem 112 can receive user input indicating which parser or parser extension to use.

In one implementation, the AI subsystem 124 can update the AI model 510 of block 320 based on the mapping of the value 406 to the predefined field 434 identified by user input or a parser or parser extension. Updating the AI model 510 can include generating training data based on the mapping identified by the user input, parser, or parser extension and training the AI model 510 based on that training data. In this manner, the AI model 510 can continue to improve its predefined field 434-identifying operations.

The following is an example execution of the method 300. At block 310, the event log analytics system 110 receives the event log 400 of FIG. 4A from the computing resources 130. The system 110 stores the event log 400 in the event log storage 120. The parsing subsystem 112 obtains the event log 400 from the event log storage 120 in order to convert the event log 400 to the predefined schema of the system 110. The parsing subsystem 112 analyzes the event log 400 and determines that the system 110 does not have a parser for the event log type of the event log 400. In response, the parsing subsystem 112 determines to use the AI subsystem 124 to convert the event log 400.

Continuing the example, at block 320, the parsing subsystem 112 provides the event log 400 to the AI subsystem 124. The AI subsystem 124 selects an AI model 510-1 from among multiple AI models 510-1, . . . , 510-*n* to identify predefined fields 434 in the predefined schema to which the event log keys 404-1, . . . , 404-9 and their corresponding values 406-1, . . . , 406-9 should map. The AI model 510-1 can include a transformer-based model. The predictive component 545 provides the first event log key-value pair 402-1 to the AI model 510-1 as input. The AI model 510-1 executes on the first event log key-value pair 402-1 and outputs the predefined field 434-1. At block 330, the AI model 510-1 outputs a confidence score of 0.9567. At block 340, the confidence score component 540 receives the confidence score and compares it to the threshold confidence score, which in this example is 0.94. Because the confidence score from the AI model 510-1 satisfies the threshold confidence score criterion, at block 350, the parsing subsystem 112 maps the value 406-1 to the predefined field 434-1. This includes generating a data object 600 with a predefined field-value pair 602-1 that includes the predefined field 434-1 and the value 604-1. The value 604-1 can include the value 406-1 converted to a different format or normalized.

Continuing the example, the method 300 repeats at block 320 for the event log key-value pair 402-6. The predictive component 545 provides the event log key-value pair 402-6 to the AI model 510-1 as input. The AI model 510-1 executes on the event log key-value pair 402-6 and outputs a predefined field 434-5. At block 330, the AI model 510-1 outputs a confidence score of 0.912. The confidence score component 540 receives the confidence score and, at block 340, compares the confidence score to the threshold confidence score, which in this example is 0.94. Because the confidence score from the AI model 510-1 is below the threshold confidence score associated with the threshold confidence score criterion, at block 360, the parsing subsystem 112 executes a further operation, e.g., request input from a user.

Continuing the example, the parsing subsystem 112 presents the UI 700 to a user. The UI 700 includes the event log key 404-6 in the first column 702, the value 406-6 in the second column 704, and a list 710 of possible predefined fields 434 in the third column 706. The top of the list 710 includes the predefined field 434-5 as the top-most item. The user selects the predefined field 434-5 to confirm that the AI model 510-1 identified the correct predefined field 434-5. The parsing subsystem 112 maps the value 406-6 to the predefined field 434-5. This includes generating, in the data object 600, the predefined field-value pair 602-5, which includes the predefined field 434-5 and the value 604-5, which includes the value 406-6 and ends this example.

Figure 8:
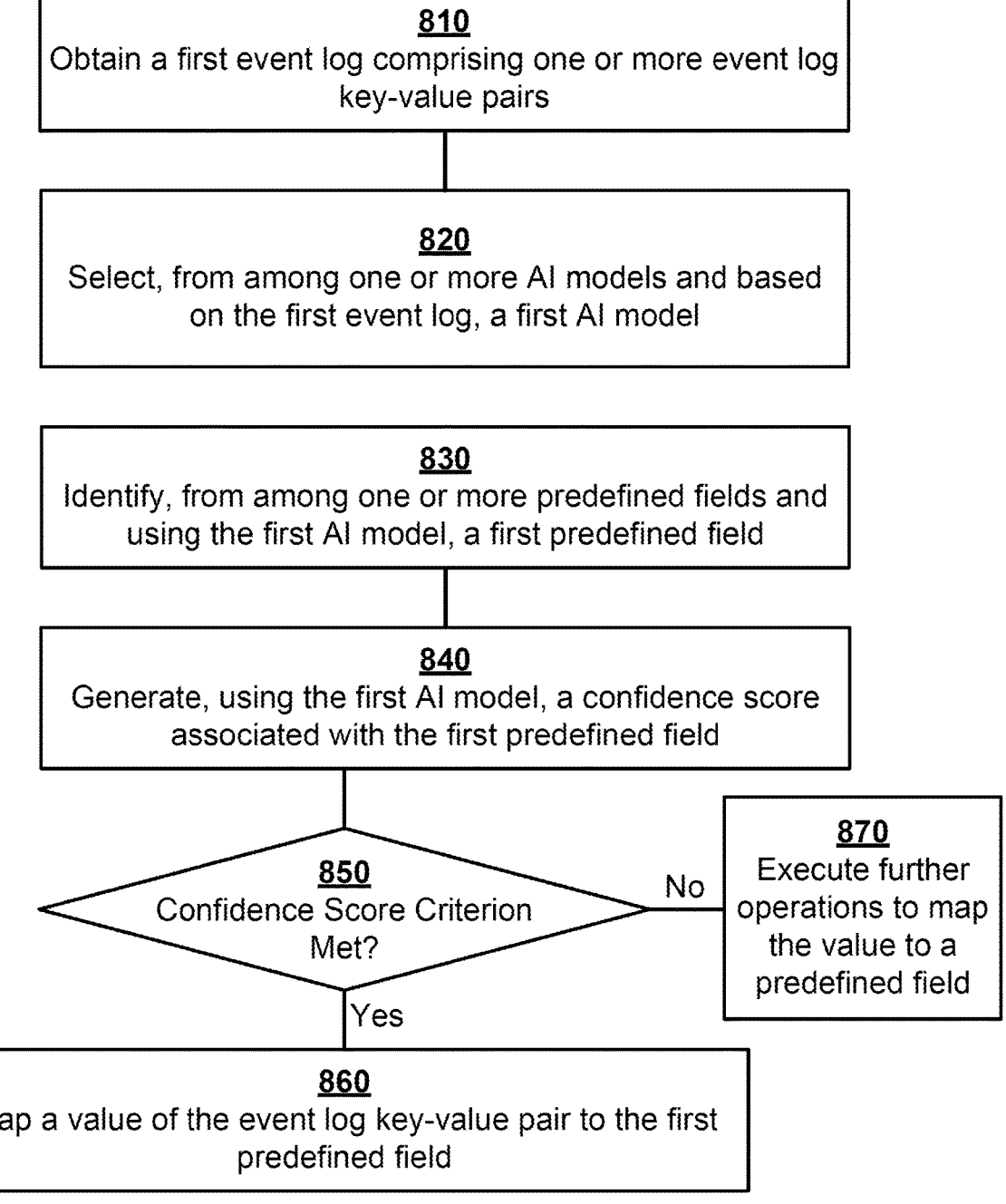
FIG. 8 depicts a flowchart illustrating an example method for practicing some aspects of the present disclosure, in accordance with various embodiments.

FIG. 8 is a flowchart illustrating one embodiment of a method 800 for AI-based automated event log mapping, in accordance with some implementations of the present disclosure. A processing device, having one or more central processing units (CPU(s)) and/or memory devices communicatively coupled to the CPU(s) and/or graphics processing units (GPU(s)) can perform the method 800 and/or each of their individual functions, routines, subroutines, or operations. In certain implementations, a single processing thread can perform the method 800. Alternatively, two or more processing threads can perform the method 800, each thread executing one or more individual functions, routines, subroutines, or operations of the method. In an illustrative example, the processing threads implementing the method

800 can be synchronized (e.g., using semaphores, critical sections, and/or other thread synchronization mechanisms). Alternatively, the processing threads implementing the method 800 can be executed asynchronously with respect to each other. Various operations of the method 800 can be performed in a different (e.g., reversed) order compared with the order shown in FIG. 8. Some operations of the method 800 can be performed concurrently with other operations. Some operations can be optional. In some embodiments, the parsing subsystem 112, the AI subsystem 124, or the event log analytics subsystem 114 may perform one or more operations of the method 800.

At block 810, processing logic obtains a first event log 400 of one or more event logs 400 of first telemetry data. The first event log 400 may include one or more event log key-value pairs 402. Block 810 may include similar functionality to block 310 of the method 300.

At block 820, processing logic selects, from among one or more AI models 510-1, . . . , 510-*n* and based on the first event log 400, a first AI model 510-1. The parsing subsystem 112 or the AI subsystem 124 can select the first AI model 510-1 based on one or more factors. In one implementation, selecting the first AI model 510-1 can be based on an event log key 404 of the first event log 400. In some implementations, selecting the first AI model 510-1 can be based on the event log type of the first event log 400.

At block 830, processing logic identifies, from among one or more predefined fields 434 and by using the first AI model 510-1, a first predefined field 434 for an event log key 404 of an event log key-value pair 402 of the one or more event log key-value pairs 402 of the first event log 400. Block 830 may include functionality similar to block 320 of the method 300.

At block 840, processing logic generates, using the first AI model 510-1, a confidence score associated with the predefined field 434 identified in block 830. Block 840 may include similar functionality to block 330 of the method 300.

At block 850, processing logic determines whether the confidence score satisfies a threshold confidence score criterion. Block 850 may include similar functionality to block 340 of the method 300. Responsive to the confidence score satisfying the threshold confidence criterion, at block 860, processing logic maps a value 406 of the event log key-value pair 402 to the first predefined field 434. Block 860 may include similar functionality to block 350 of the method 300.

Responsive to the processing logic determining that the confidence score does not satisfy the threshold confidence score criterion (e.g., because the confidence score is below a threshold confidence score associated with the threshold confidence score criterion), at block 870, processing logic executes one or more further operations to map the value 407 of the event log key-value pair 402 to a predefined field. Block 870 may include functionality similar to the functionality of block 360 of the method 300. The one or more further operations of block 870 may include the parsing subsystem 112 using a second AI model 510-2 to identify a second predefined field 434 and to generate a second confidence score for the second predefined field 434. The method 800 may then return to block 850. Responsive to the second confidence score satisfying the threshold confidence score criterion at block 850, at block 860, processing logic maps the value 406 to the second predefined field 434. In one or more implementations, the first and second predefined fields 434 may be the same predefined field 434, which can indicate that both AI models 510-1, 510-2 identified the same predefined field 434, but the second AI model 510-2 was more confident in its output. In some implementations, the first and second AI models 510-1, 510-2 may be different types of AI models 510. For example, the first AI model 510-1 may include an ANN-based AI model 510, and the second AI model 510-2 may include a transformer-based AI model 510.

In some implementations, the method 300 or 800 may further include performing one or more data analysis operations on a data object 600. The data object 600 may have been generated as part of, or in response to, the parsing subsystem 112 executing on an event log 400 as part of block 350 or 860. Performing the one or more data analysis operations may include performing a statistical analysis on the data object 600, performing an inference calculation on the data object 600 using one or more AI models (which may be different than the one or more AI models 510-1, . . . , 510-n), or performing some other type of data analysis operation. In some implementations, performing the one or more data analysis operations may include performing the one or more data analysis operations on multiple data objects 600. Performing the one or more data analysis operations may include identifying trends in the one or more data objects 600 regarding use of the computing devices or software of the computing resources 130, identifying a cyberattack on the computing resources 130, or may include other operations. The event log analytics subsystem 114 may perform the data analysis operations. In some implementations, a user of the computing resources 130 may view the results of the data analysis. The end user may use a user interface of the computing resources 130 that is in data communication with the event log analytics subsystem 114 to view the results.

In some implementations, the one or more first event logs 400 may be generated by one or more nodes of a cloud-based system at a first point in time. The one or more nodes of the cloud system may include one or more components 132, 134, 136 of the computing resources 130. The one or more second event logs 400 may be generated by the one or more of nodes of the cloud-based system at a second point in time. In one implementation, using an AI model 510 to identify predefined field 434 to which values 406 of an event log 400 should map can result in the detection of an indication of malicious activity with respect to a node of the cloud-based system. In some implementations, the detection of the malicious activity may include the event log analytics subsystem 114 analyzing the data object 600 generated by the parsing subsystem 112.

In some implementations, the parsing subsystem 112 may include functionality in addition to mapping event log keys 404 or values 406 to predefined fields 434. For example, in one implementation, the parsing subsystem 112 can normalize the value 406 mapped to a predefined field 434. In certain implementations, the parsing subsystem 112 can convert a value 406 into a different data format. For example, the raw event log 400 may include a timestamp in the UNIX epoch timestamp format (e.g., 1588059648.129), and the predefined format may include a timestamp in the format [YEAR]-[MONTH]-[DAY] T [HOUR]: [MINUTE]: [SECOND] Z (e.g., 2020-04-28T07:40:48.129Z) where T indicates that the data following the "T" is the clock time and Z indicates that the timestamp is offset from Coordinated Universal Time (UTC) by 0. In another example, the parsing subsystem 112 can convert a float to an integer. In certain implementations, the parsing subsystem 112 may automatically include certain data in the predefined format. For example, the parsing subsystem 112 may include one or more predefined fields 434 in a data object that indicate the event type of the event log 400, the device that generated the event log 400 (e.g., the device's product name, the device's model identifier, the device's manufacturer or vendor, etc.), the software that generated the event log 400 (e.g., the software's name, the software's version, the software's developer or vendor, etc.), or other predefined fields.

In some implementations, the first event log 400 may include an event log type. The event log type can indicate information about the nature of the event represented by the event log 400. The event log type may be indicated in the event log 400 itself or may be indicated by metadata associated with the event log 400. For example, in FIG. 6, the event log type may be indicated by the predefined field-value pair 602-8, where the predefined field 434-8 is "metadata.event_type" and the corresponding value 604-8 is "NETWORK HTTP." This can indicate that the event log type of the event log 400 of FIG. 4A relates to Hypertext Transfer Protocol (HTTP) networking. As can also be seen from FIG. 4A, the event log 400 did not include a key 404 that indicated the event log type. Thus, the parsing subsystem 112 may have determined the event log type from metadata associated with the event log 400.

In one implementation, the parsing subsystem 112 can identify the event log type of the first event log 400. In some implementations, block 320 of the method 300 or block 830 of the method 800 may be responsive to the event log type of the first event log 400 not being associated with an event log parser stored in an event log parser storage of the event log analytics system 110. In some implementations, the event log analytics system 110 may include an event log parser storage. The event log parser storage can store one or more event log parsers or parser extensions. The event log parser storage may include data that indicates which event log type(s) a parser or parser extension is compatible with (e.g., because a user created a parser or parser extension for that event log type). In response to no parser or parser extension being compatible with the event log type of the first event log 400 (indicating that no parser exists to parse the first event log 400), the parsing subsystem 112 can use the AI subsystem 124 to parse the first event log 400.

In some implementations, the first event log 400 may be contained within header data. The parsing subsystem 112 can extract the first event log 400 from the header data. The header data may include a syslog header. In one or more implementations, extracting the event log 400 may include the user providing pattern-matching data to the parsing subsystem 112 and the parsing subsystem 112 stripping out portions of the data that satisfy the pattern-matching data (e.g., the header data that contains the event log 400) or to extract portions of the data that satisfy the pattern-matching data (e.g., the event log 400). The pattern-matching data may include a regular expression or some other type of pattern-matching data.

While FIG. 4A depicts an event log 400 with nine keys 404, an event log 400 may have any number of keys 404. Similarly, while the set 430 of mappings 432 in FIG. 4B includes seven mappings 432, a set 430 of mappings 432 may include any number of mappings 432. While the data object 600 of FIG. 6 includes ten predefined fields 434, a data object 600 may include any number of predefined fields 434.

Figure 9:
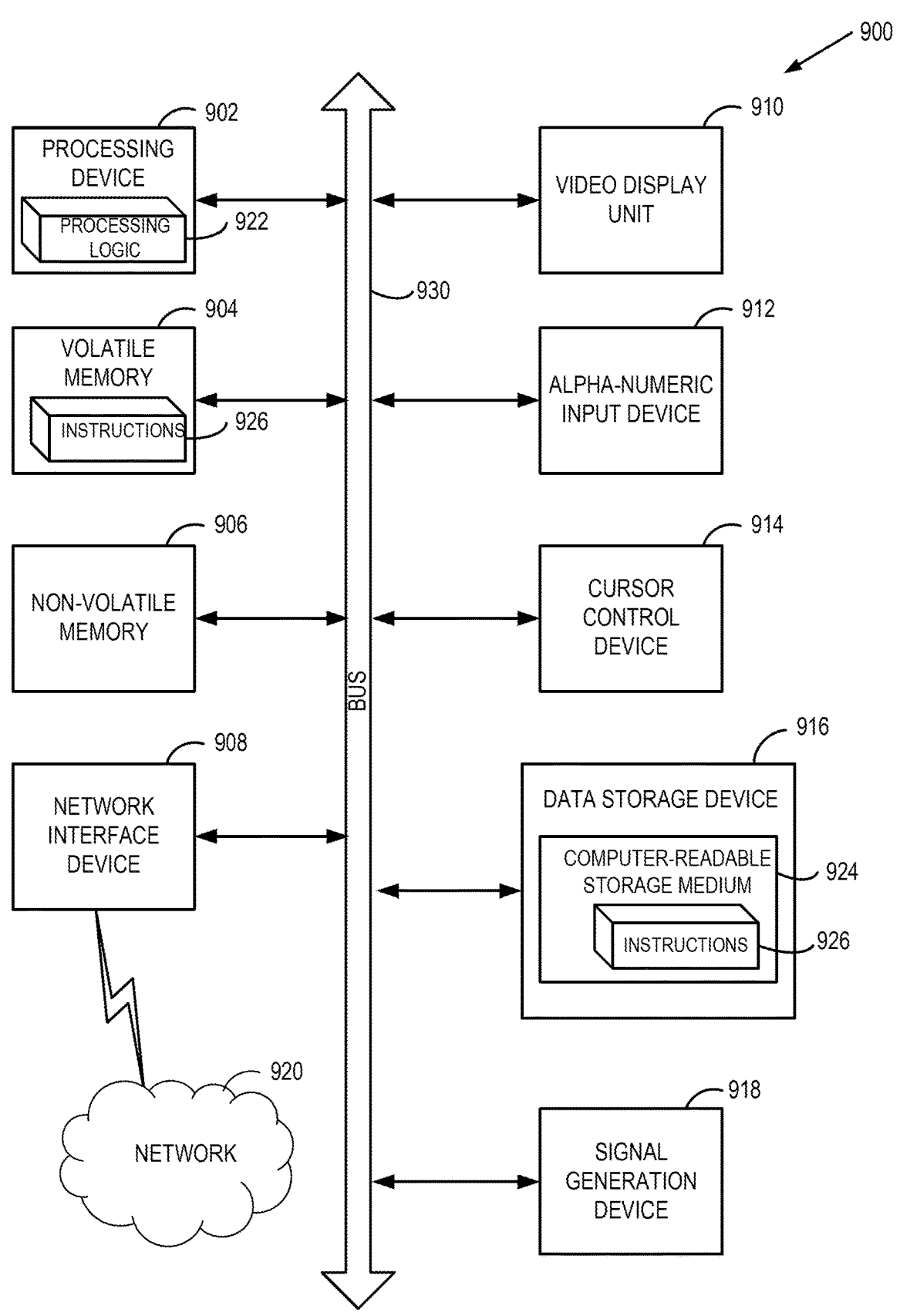
FIG. 9 depicts a block diagram of an example computer device capable of AI-based automated event log mappings, in accordance with some implementations of the present disclosure.

FIG. 9 is a block diagram illustrating an example computer system 900, in accordance with implementations of the present disclosure. The computer system can be a computing device or other device discussed herein. The computer system 900 can be the event log analytics system 19, the parsing subsystem 112, the event log analytics subsystem 114, the event log storage 120, the mapping storage 122, the AI subsystem 124, a server 132, a network device 134, or a data storage device 136 of FIG. 1. The computer system 900 can be a cloud management system 212 of FIG. 2B. The computer system 900 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a volatile memory 904 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 906 (e.g., flash memory, static random access memory (SRAM), etc.), and a data storage device 916, which communicate with each other via a bus 930.

The processing device 902 represents one or more general-purpose processing devices such as a microprocessor, CPU, GPU, or the like. More particularly, the processing device 902 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 can also be one or more special-purpose processing devices such as an ASIC, a field programmable gate array (FPGA), a digital signal processor (DSP), network processor, or the like. The processing device 902 is configured to execute instructions 926 (e.g., for performing one or more of the methods 300 or 800) for performing the operations discussed herein.

The computer system 900 can further include a network interface device 908. The network interface device 908 can assist in data communication between computing devices. The computer system 900 also can include a video display unit 910 (e.g., a liquid crystal display (LCD) or a cathode ray tube (CRT)), an input device 912 (e.g., a keyboard, and alphanumeric keyboard, a motion sensing input device, touch screen), a cursor control device 914 (e.g., a mouse), and a signal generation device 918 (e.g., a speaker).

The data storage device 916 can include a non-transitory machine-readable storage medium 924 (also computer-readable storage medium) on which is stored one or more sets of instructions 926 (e.g., for AI-based automated event log mapping and other functionality disclosed herein) embodying any one or more of the methodologies or functions described herein. The instructions 926 can also reside, completely or at least partially, within the volatile memory 904 and/or within the processing device 902 during execution thereof by the computer system 900, the volatile memory 904 and the processing device 902 also constituting machine-readable storage media. The instructions 926 can further be transmitted or received over a network 920 via the network interface device 908.

In one implementation, the instructions 926 include instructions for AI-based automated event log mapping or execution. While the computer-readable storage medium

924 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods 300 and 800 are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/ or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   obtaining a first event log of a first plurality of event logs of first telemetry data, wherein the first event log comprises a plurality of event log key-value pairs;
   identifying, from among a plurality of predefined fields and by using an artificial intelligence (AI) model, a first predefined field for an event log key of an event log key-value pair of the plurality of event log key-value pairs;
   generating, using the AI model, a confidence score associated with the first predefined field; and
   responsive to the confidence score satisfying a threshold confidence score criterion, mapping a value of the event log key-value pair to the first predefined field.

2. The method of claim 1, further comprising responsive to the confidence score being below a threshold confidence score associated with the threshold confidence score criterion, executing an event log parser that maps the value to a second predefined field.

3. The method of claim 2, further comprising updating the AI model based on mapping the value to the second predefined field.

4. The method of claim 2, wherein the event log parser comprises parser code, and the parser code comprises source code configured to be compiled into computer-readable instructions.

5. The method of claim 1, wherein:
   the first event log is contained within a syslog header; and
   the method further comprises extracting the first event log from the syslog header.

6. The method of claim 1, wherein:
   the method further comprises identifying an event log type of the first event log; and
   identifying, from among the plurality of predefined fields and by using the AI model, the first predefined field for the event log key is responsive to the event log type of the first event log not being associated with an event log parser stored in an event log parser storage of an event log analytics system.

7. The method of claim 1, wherein mapping the value to the first predefined field comprises generating a data object comprising a predefined field-value pair comprising the first predefined field and the value.

8. A system, comprising:

a memory; and at least one processing device, coupled to the memory, configured to perform operations, comprising:

obtaining a first event log of a first plurality of event logs of first telemetry data, wherein the first event log comprises a plurality of event log key-value pairs;

identifying, from among a first plurality of predefined fields and by using an artificial intelligence (AI) model, a first predefined field for an event log key of an event log key-value pair of the plurality of event log key-value pairs;

generating, using the AI model, a confidence score associated with the first predefined field; and responsive to the confidence score satisfying a threshold confidence score criterion, mapping a value of the event log key-value pair to the first predefined field.

9. The system of claim 8, wherein the AI model comprises a transformer-based AI model.

10. The system of claim 9, wherein the operations further comprise training the transformer-based AI model, comprising causing the AI model to ingest a corpus of text data.

11. The system of claim 10, wherein the corpus of text data comprises at least one of:

a second plurality of event logs;

a plurality of portions of event log parser code; or a second plurality of predefined fields.

12. The system of claim 8, wherein the AI model comprises an artificial neural network-based (ANN-based) model.

13. The system of claim 12, wherein the operations further comprise training the ANN-based AI model on a plurality of pieces of training data, wherein each piece of training data comprises an event log key and a ground truth comprising a corresponding predefined field.

14. The system of claim 8, wherein the operations further comprise, responsive to the confidence score being below a threshold confidence score associated with the threshold confidence score criterion:

obtaining an input from a user interface indicating a second predefined field; and mapping the value to the second predefined field.

15. A method, comprising:

obtaining a first event log of a first plurality of event logs of first telemetry data, wherein the first event log comprises a plurality of event log key-value pairs;

selecting, from among a plurality of artificial intelligence (AI) models and based on the first event log, a first AI model;

identifying, from among a plurality of predefined fields and by using the first AI model, a first predefined field for an event log key of an event log key-value pair of the plurality of event log key-value pairs;

generating, using the first AI model, a first confidence score associated with the first predefined field; and responsive to the first confidence score satisfying a threshold confidence score criterion, mapping a value of the event log key-value pair to the first predefined field.

16. The method of claim 15, wherein:

the plurality of AI models comprises the first AI model and a second AI model;

the first AI model comprises an artificial neural network (ANN)-based AI model; and the second AI model comprises a transformer-based AI model.

17. The method of claim 15, wherein selecting the first AI model based on the first event log comprises selecting the first AI model based on the event log key of the first event log.

18. The method of claim 15, further comprising, responsive to the first confidence score being below a threshold confidence score associated with the threshold confidence score criterion:

identifying, from among the plurality of predefined fields and by using a second AI model of the plurality of AI models, a second predefined field for the event log key;

generating, using the second AI model, a second confidence score associated with the second predefined field; and responsive to the second confidence score satisfying the threshold confidence score criterion, mapping the value to the second predefined field.

19. The method of claim 15, wherein:

the first event log is contained within a syslog header; and the method further comprises extracting the first event log from the syslog header.

20. The method of claim 15, wherein mapping the value to the first predefined field comprises generating a data object comprising a predefined field-value pair comprising the first predefined field and the value.

* * * * *